United States Patent
Oh et al.

(10) Patent No.: US 11,549,415 B2
(45) Date of Patent: Jan. 10, 2023

(54) VALVE ASSEMBLY FOR VEHICLE EXHAUST SYSTEM

(71) Applicant: Faurecia Korea Ltd., Gyeonggi-do (KR)

(72) Inventors: Young-Hwan Oh, Ansan-si (KR); Florian Leroy, Gyeonggi-do (KR)

(73) Assignee: Faurecia Korea Ltd.

( * ) Notice: Subject to any disclaimer, the term of this patent is extended or adjusted under 35 U.S.C. 154(b) by 745 days.

(21) Appl. No.: 16/502,202

(22) Filed: Jul. 3, 2019

(65) Prior Publication Data

US 2020/0011219 A1   Jan. 9, 2020

(51) Int. Cl.

| | |
|---|---|
| *F01N 1/16* | (2006.01) |
| *F16K 1/18* | (2006.01) |
| *F16K 17/04* | (2006.01) |
| *F16K 47/02* | (2006.01) |
| *F01N 13/18* | (2010.01) |

(52) U.S. Cl.
CPC ......... *F01N 1/163* (2013.01); *F01N 13/1844* (2013.01); *F16K 1/18* (2013.01); *F01N 2240/36* (2013.01); *F01N 2610/1446* (2013.01)

(58) Field of Classification Search
CPC . F01N 1/16; F01N 1/165; F01N 1/168; F01N 1/163; F01N 13/08; F01N 2240/36; F01N 2610/1446; F16K 1/18; F16K 1/2028; F16K 1/2042; F16K 1/205; F16K 1/2085; F16K 1/2092; F16K 1/224; F16K 1/226; F16K 1/2261; F16K 1/228; F16K 1/2285; F16K 17/0433; F16K 47/00; F16K 47/01; F16K 47/012; F16K 47/02; F16K 47/023; F02D 9/08; F02D 9/10; F02D 9/1015; F02D 9/102; F02D 9/106
See application file for complete search history.

(56) References Cited

U.S. PATENT DOCUMENTS

| | | | |
|---|---|---|---|
| 8,657,065 B1 | 2/2014 | Hill | |
| 8,950,731 B2 * | 2/2015 | Ishihata | ................ F01N 3/2892 251/301 |
| 9,605,581 B1 * | 3/2017 | Middleton, Jr. | ........... F01N 9/00 |

(Continued)

FOREIGN PATENT DOCUMENTS

| | | | | |
|---|---|---|---|---|
| DE | 19650906 A1 * | 6/1997 | ............. | B60H 1/249 |
| DE | 102007042328 A1 * | 3/2009 | ............... | F02D 9/04 |

(Continued)

*Primary Examiner* — Edgardo San Martin
(74) *Attorney, Agent, or Firm* — Carlson, Gaskey & Olds, P.C.

(57) ABSTRACT

A valve assembly for a vehicle exhaust system includes an exhaust component body defining an exhaust gas flow path and a flap mounted to pivot in the exhaust gas flow path between a minimum flow position and a maximum flow position. At least one bushing supports the flap for rotational movement relative to the exhaust component body about an axis. In one example, a damper is positioned radially between the bushing and the flap and defines an inner diameter that is smaller than an outer diameter of the bushing. In another example, a damper is attached to the flap such that a distal edge is free from attachment to a distal edge of the flap such that as the flap returns to the minimum flow position the damper first contacts the exhaust component body and then the flap contacts the damper.

25 Claims, 2 Drawing Sheets

(56) References Cited

U.S. PATENT DOCUMENTS

| | | | |
|---|---|---|---|
| 10,738,714 B2 * | 8/2020 | Greber | F16K 1/2028 |
| 10,788,136 B1 * | 9/2020 | Thomas | F01N 1/089 |
| 10,982,771 B2 * | 4/2021 | Botella | F16K 1/221 |
| 2002/0033303 A1 * | 3/2002 | Nagai | F01N 1/165 |
| | | | 181/275 |
| 2007/0080314 A1 * | 4/2007 | Abram | F01N 1/18 |
| | | | 251/305 |
| 2017/0241349 A1 | 8/2017 | Greber et al. | |
| 2019/0032607 A1 * | 1/2019 | Stockinger | F02B 37/183 |
| 2020/0309278 A1 * | 10/2020 | Thomas | F01N 1/165 |
| 2022/0010738 A1 * | 1/2022 | Grün | F16K 47/012 |

FOREIGN PATENT DOCUMENTS

| | | | | |
|---|---|---|---|---|
| DE | 102015221953 A1 * | 5/2017 | | F02M 26/10 |
| DE | 102016223444 B3 * | 5/2018 | | |
| DE | 102018206791 A1 * | 11/2019 | | F02D 9/06 |
| EP | 1561996 A1 * | 8/2005 | | F23J 11/12 |
| GB | 2519239 A * | 4/2015 | | F02D 9/106 |
| JP | H09250326 A * | 9/1997 | | F01N 1/166 |
| JP | 3126106 B2 * | 1/2001 | | F01N 1/166 |
| KR | 101709163 B1 | 2/2017 | | |
| KR | 1020170098711 A | 8/2017 | | |
| WO | WO-2014166593 A1 * | 10/2014 | | F02B 37/183 |

\* cited by examiner

VALVE ASSEMBLY FOR VEHICLE EXHAUST SYSTEM

TECHNICAL FIELD

The subject invention relates to a valve assembly in a vehicle exhaust system, and more particularly to a valve assembly that includes one or more dampers to eliminate rattling noise and reduce leakage.

BACKGROUND OF THE INVENTION

Exhaust systems are widely known and used with combustion engines. Typically, an exhaust system includes exhaust tubes or pipes that convey hot exhaust gases from the engine to other exhaust system components, such as catalysts, filters, mufflers, resonators, etc. Mufflers and resonators include acoustic chambers that cancel out sound waves carried by the exhaust gases. Although effective, these components are often relatively large in size and provide limited nose attenuation.

Attempts have been made to improve low frequency noise attenuation by either increasing muffler volume or increasing backpressure. Increasing muffler volume is disadvantageous from a cost, material, and packaging space perspective. Increasing backpressure can adversely affect engine power.

Another solution for reducing low frequency noise is to use a valve assembly such as a passive or actively controlled valve, for example. In one known configuration, a passive valve comprises a flap that is supported by bushings or bearings for pivoting movement within a tube. The flap is resiliently biased to a closed or minimum flow position by a spring. The flap moves to an open or maximum flow position as exhaust gas pressure increases to overcome the biasing force of the spring.

One disadvantage with a traditional passive valve configuration is the noise that is generated due to movement of the flap against the tube when the flap moves to the closed position. Another disadvantage is a rattling noise that is generated at a mount interface to the bushing/bearing. In addition to generating undesirable noise, these rattling or vibratory events at these locations can result in increased exhaust gas leakage.

SUMMARY OF THE INVENTION

In one exemplary embodiment, a valve assembly for a vehicle exhaust system includes an exhaust component body defining an exhaust gas flow path and a flap mounted to pivot in the exhaust gas flow path between a minimum flow position and a maximum flow position. At least one bushing supports the flap for rotational movement relative to the exhaust component body about an axis, and at least one damper is positioned radially between the bushing and the flap. The at least one damper defines an inner diameter that is smaller than an outer diameter of the at least one bushing.

In another exemplary embodiment, a valve assembly for a vehicle exhaust system includes an exhaust component body defining an exhaust gas flow path and a flap mounted to pivot in the exhaust gas flow path between a minimum flow position and a maximum flow position. The flap has a first flap edge that defines a pivot axis and a second flap edge that pivots between the minimum and maximum flow positions. At least one damper is attached to an upstream face of the flap to reduce noise as the flap moves to the minimum flow position. The at least one damper has a first edge that is fixed to the flap at a location near the first flap edge and a second edge that is free from attachment to the second flap edge such that as the flap returns to the minimum flow position, the second edge of the damper first contacts the exhaust component body and then the second flap edge contacts the second edge of the damper.

In a further embodiment of either of the above, the at least one damper comprises at least a first damper located between the bushing and the flap and a second damper that is attached to the flap.

In a further embodiment of any of the above, the first damper is comprised of a low density mesh material.

In a further embodiment of any of the above, the second damper is comprised of a high density mesh material.

These and other features of the present invention can be best understood from the following specification and drawings, the following of which is a brief description.

DETAILED DESCRIPTION OF THE PREFERRED EMBODIMENT

Figure 1:
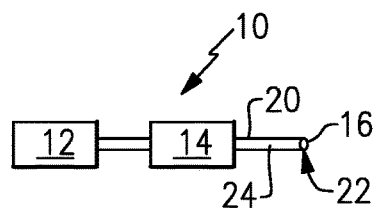
FIG. 1 shows a schematic view of one example of an exhaust component and valve assembly.

FIG. 1 shows a vehicle exhaust system 10 that conducts hot exhaust gases generated by an engine 12 through various exhaust components 14 to reduce emissions and control noise as known. The various exhaust components 14 can include one or more of the following: pipes, tubes, filters, valves, catalysts, resonators, mufflers etc. The components 14 can be mounted in various different configurations and combinations dependent upon vehicle application and available packaging space. The exhaust components 14 direct the exhaust gases to an outlet 16 to atmosphere, which can comprise one or more tailpipes, for example.

Figure 2:
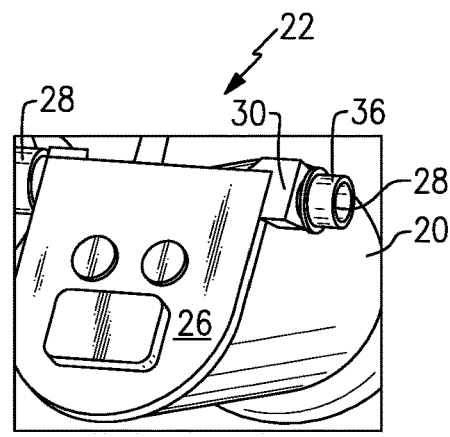
FIG. 2 shows a perspective view of one example of a valve and a damper associated with a bushing.

As shown in FIG. 2, an exhaust component, such as an exhaust tube or pipe 20 includes a valve assembly 22 that is used to reduce noise generated by the exhaust system 10. The valve assembly 22 is movable between an open position (dashed lines FIG. 5), i.e. maximum flow position, where there is minimal blockage of an exhaust gas flow path 24 and a closed position (FIG. 5), i.e. minimum flow position, where a maximum portion of the exhaust gas flow path 24 is blocked. In one example, the valve assembly 22 comprises a passive valve assembly 12 that is resiliently biased toward the closed position via a spring or other similar mechanism and is solely moved toward the open position when exhaust gas flow generates a pressure sufficient enough to overcome the biasing force.

In the example shown, the exhaust pipe 20 comprises a single pipe body that defines the exhaust gas flow path 24. In one example, the pipe 20 has a circular cross-section; however, the pipe could have other cross-sectional shapes depending upon the vehicle application and/or packaging space constraints. Further, in the example shown, the valve 22 is located in an outlet pipe 20, e.g. a tailpipe; however, the valve 22 could also be located in other positions within the exhaust system 10 such as inlet pipe or bypass pipe for example.

Figure 3:
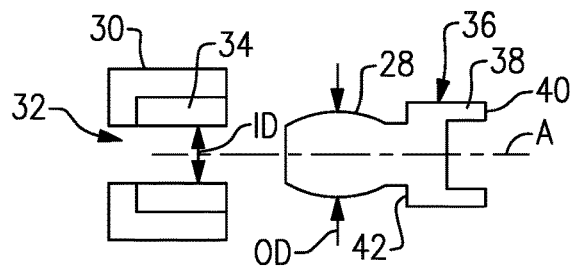
FIG. 3 is an exploded view of the bushing, damper, and a mount for the bushing of FIG. 2.

The valve assembly 22 includes a valve body or flap 26 that blocks a maximum portion of the exhaust gas flow path 24 when in the closed position. As discussed above, the flap 26 is pivoted toward the open position to minimize blockage of the exhaust gas flow path 24 in response to pressure exerted against the flap 26 by exhaust gases. At least one bushing 28 supports the flap 26 for rotational movement relative to the pipe 20 about an axis A (FIG. 3). In the example shown, two bushings 28 are used to support the flap 26, one on each side of the flap 26. As shown in FIG. 3, the flap 26 includes a mounting boss 30 for each bushing 28 that provides an internal recess 32 that receives the bushing 28.

In one example, a damper 34 is positioned radially between at least one of the bushings 28 and the associated mounting boss 30 of the flap 26. The damper 34 is comprised of a low density wire mesh material. In one example, the wire mesh material has a density that is within a range of 1.5 g/cm$^3$ to 3.5 g/cm$^3$, and more preferably within a range of 2.0 g/cm$^3$ to 3.0 g/cm$^3$. In one example, the wire mesh material has a density of 2.5 g/cm$^3$.

The damper 34 defines an inner diameter ID that is smaller than an outer diameter OD of the bushing 28. The use of a damper 34 between the flap 26 and bushing 28 eliminates any potential gap at this mounting location, which significantly reduces the chance for generating a rattling noise. Further, by providing the damper 34 with an inner diameter ID that is smaller than the outer diameter OD of the bushing 28, a "negative gap" is provided as the wire mesh material of the damper 34 must be compressed radially outwardly as the bushing 28 is inserted into the recess 32. This compressive mounting arrangement continuously maintains the flap 28 in a correct mounting position and allows the flap to pivot easily between the open and closed positions, while also eliminating the possibility of rattling noise. Further, the low density mesh material allows for accommodation of any thermal expansion that may occur, as opposed to a high density wire mesh material which may cause the movement of the flap to bind.

In one example, the damper 34 comprises a ring-shaped body that surrounds the bushing 28. The bushing 28 includes a mount structure 36 that is fixed to a non-rotating structure, such as the pipe 20 for example, to allow the flap 26 to pivot about the axis A defined by the bushing 28. In one example, the mount structure 36 comprises a cup-shaped portion 38 that is open at one end 40 and closed at an opposite end 42. The bushing 28 extends axially outwardly of the opposite end 42 to be received within the recess 32 of the mounting boss 30 of the flap 26. The bushing 28 provides a curved outer peripheral surface that allows the flap 26 to pivot smoothly about the axis A.

Figure 4:
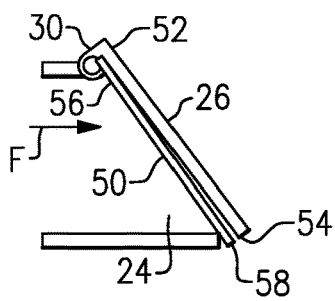
FIG. 4 shows a schematic side view of another example of a valve and a damper for a flap of the valve in a first position.
Figure 5:
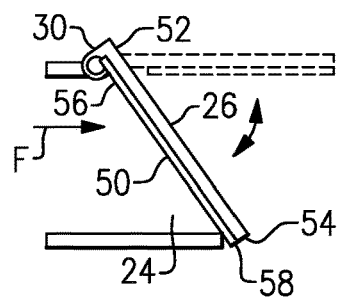
FIG. 5 is a view similar to FIG. 4 but showing the valve in a second position subsequent to the first position.

FIGS. 4-5 show another example of a damper 50. In this example, the damper 50 is attached to the flap 26 to reduce noise as the flap 26 moves to the minimum flow position. The flap 26 comprises a generally flat disc-shaped body that includes the mounting boss 30 at one edge 52, i.e. a first edge, and extends to a distal edge 54, i.e. a second edge, that pivots between the minimum and maximum flow positions. The damper 50 has a first edge 56 that is fixed to the flap 26 at a location near the first edge 52 and a second edge 58 that is free from attachment to the distal edge 54 of the flap 26 such that as the flap 26 returns to the minimum flow position, the second edge 58 of the damper 50 first contacts the pipe 20 (FIG. 4) and then the distal edge 54 of the flap 26 contacts the second edge 58 of the damper 50 (FIG. 5). Thus, in this configuration, the distal edge of the damper 50 is sandwiched between the pipe 20 and the flap 26 when in the closed position.

In one example, the pipe 20 has an open end, and when in the minimum flow position, the flap 26 closes the open end. During operation, a rattling noise is generated from the flapping movement of the flap 26 within the pipe 20 as the flap 26 approaches the closed position to contact the open end of the pipe 20. As the second edge 58 of the damper 50 is free from attachment to the flap itself, it first contacts the end of the pipe 20 with the distal edge 54 of the flap 26 subsequently contacting the edge 58 of the damper 50 to eliminate any rattling noise.

In this example, the damper 50 is comprised of a high density wire mesh material. A high density wire mesh material is required to reduce internal leakage. If the density is too low, then internal leakage is too high and the heat recovery performance of the system drastically decreases. In one example, the wire mesh material has a density that is within a range of 4.0 g/cm$^3$ to 6.5 g/cm$^3$, and more preferably within a range of 4.5 g/cm$^3$ to 5.5 g/cm$^3$. In one example, the wire mesh material has a density of 5.0 g/cm$^3$.

Figure 6:
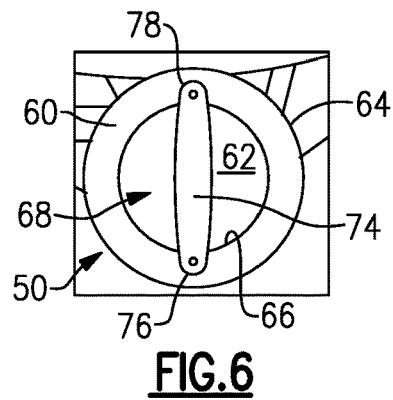
FIG. 6 is an upstream end view of one example of the damper of FIGS. 4-5.
Figure 7:
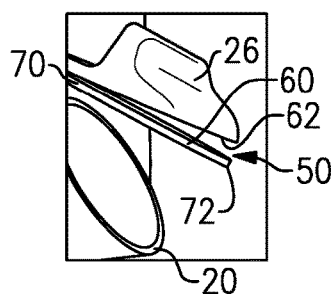
FIG. 7 is a perspective view of the damper of FIG. 6 in a view similar to FIG. 4.

One example of a damper 50 is shown in FIGS. 6-7. In this example, the damper 50 comprises a ring-shaped body 60 (FIG. 6) that is mounted to an upstream face 62 of the flap 26. The ring-shaped body 60 has an outer peripheral surface 64 and an inner peripheral surface 66 that defines an inner open area 68. A first edge 70 of the ring-shaped body 60 is fixed to the flap 26 near the axis A. A second edge 72 of the ring-shaped body 60 is free from attachment to the flap 26 to provide a cantilevered mounting arrangement of the damper 50 (FIG. 7).

A blade spring 74 has a first end 76 that is coupled to the second edge 72 of the ring-shaped body 60 and extends across the open area 68 of the ring-shaped body 60 toward the first edge 70. A second end 78 of the blade spring 74 is attached to the first edge 70 of the ring-shaped body 60 and/or to the flap 26. The first 76 and second 78 ends of the blade spring 74 can be attached via welding, brazing, fastening, adhering, or by any other known attachment method. In this example, the blade spring 74 provides the damping function and the wire mesh body 60 provides the sealing function.

Figure 8:
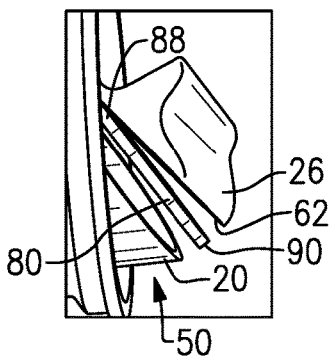
FIG. 8 is a perspective view of another example of the damper of FIGS. 4-5.
Figure 9:
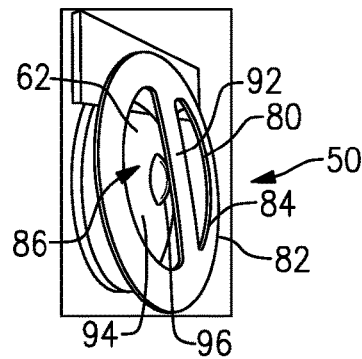
FIG. 9 is an upstream end view of the damper of FIG. 8.

Another example of a damper 50 is shown in FIGS. 8-9. In this example, the damper 50 comprises a flat ring-shaped body 80 (FIG. 9) that is mounted to the upstream face 62 of the flap 26. The ring-shaped body 80 has an outer peripheral surface 82 and an inner peripheral surface 84 that defines an inner open area 86. A first edge 88 of the ring-shaped body 80 is fixed to the flap 26 near the axis A. A second edge 90 of the ring-shaped body 80 is free from attachment to the flap 26 to provide a cantilevered mounting arrangement of the damper 50 (FIG. 8). The ring-shaped body 80 includes an integrally formed bridge portion 92 that extends across the ring-shaped body 80 to divide the open area 86 in half.

In this example, the upstream face 62 of the flap 26 includes at least one protrusion 94. The protrusion 94 is positioned to deform a portion of the bridge portion 92 to define a protruding portion 96. In one example, the protrusion 94 is in contact with a center of the bridge portion 92. The protruding portion 96 extends outwardly of a plane that generally defines the flat ring-shaped body 60. In this example, the protruding portion 96 of the ring-shaped body 80 provides the damping function and the ring-shaped body 80 provides the sealing function.

Figure 10:
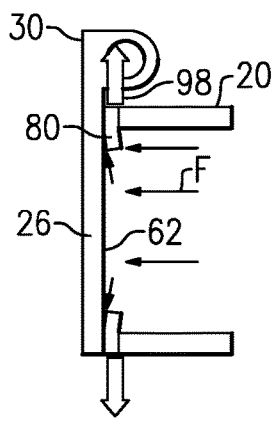
FIG. 10 is a schematic side view showing a leak path for the example of FIGS. 8-9.
Figure 11:
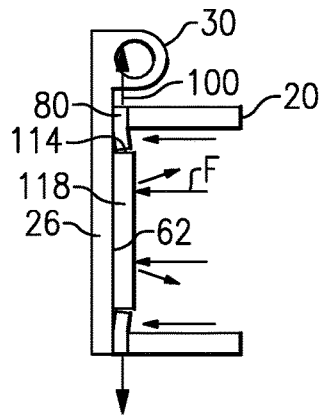
FIG. 11 is a schematic side view of a leak path for another example of a damper of the FIGS. 4-5.

FIG. 10 shows a schematic view of a leak path 98 through the ring-shaped body 80 of FIG. 9. The exhaust gas flow F contacts the upstream face 62 of the flap 26 and is directed radially outwardly through the ring-shaped body 62 and out through a small gap between the pipe 20 and the flap 26 as indicated at 98. FIG. 11 shows an example configuration that reduces the amount of leakage through this gap as indicated at 100.

Figure 12:
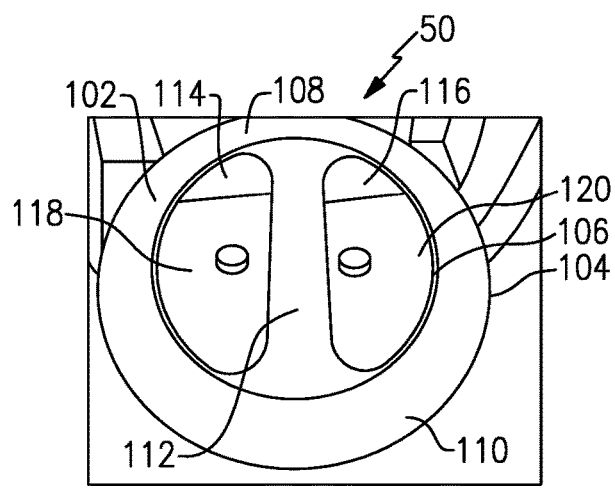
FIG. 12 is an upstream end view of the damper of FIG. 11.

In the example of FIG. 11, the damper 50 comprises a flat ring-shaped body 102 (FIG. 12) that is mounted to the upstream face 62 of the flap 26. The ring-shaped body 102 has an outer peripheral surface 104 and an inner peripheral surface 106 that defines an inner open area. A first edge 108 of the ring-shaped body 102 is fixed to the flap 26 near the axis A. A second edge 110 of the ring-shaped body 102 is free from attachment to the flap 26 to provide a cantilevered mounting arrangement of the damper 50 similar to that shown in FIG. 9. The ring-shaped body 102 includes an integrally formed bridge portion 112 that extends across the ring-shaped body 102 to divide the open area into a first open area 114 and a second open area 116.

In this example, the upstream face 62 of the flap 26 includes at least a first protrusion 118 and a second protrusion 120. The first 118 and second 120 protrusions respectively fill, or at least partially fill, the first 114 and second 116 open areas. An additional protrusion similar to protrusion 94 shown in FIG. 9 can be used to deform a portion of the bridge portion 112 to define a protruding portion to provide damping as described above. By filling the open areas 114, 116, the inner peripheral surfaces of the wire mesh body 102, e.g. surface 106 and surfaces along the bridge portion 112, are protected and the amount of gas exiting through the gap 100 is significantly reduced.

In each of the examples, the deformation of the damper 50 eliminates the noise generated by the movement of the flap 26. Further, using a negative gap on the bushing 28 eliminates rattling noise at this mount interface to the flap. Additionally, by further protecting inner peripheral surfaces of the mesh body, a configuration is provided with significantly reduced leakage.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A valve assembly for a vehicle exhaust system comprising:
   an exhaust component body defining an exhaust gas flow path;
   a flap mounted to pivot in the exhaust gas flow path between a minimum flow position and a maximum flow position;
   at least one bushing to support the flap for rotational movement relative to the exhaust component body about an axis; and
   at least one damper positioned radially between the bushing and the flap, and wherein the at least one damper defines an inner diameter that is smaller than an outer diameter of the at least one bushing, and wherein the at least one damper comprises a low density wire mesh material.

2. The valve assembly according to claim 1 wherein the flap includes a mounting boss that provides an internal recess that receives the at least one bushing, and wherein the damper is positioned within the internal recess to surround the at least one bushing.

3. The valve assembly according to claim 2 wherein the low density wire mesh material has a density that is less than 3.5 g/cm$^3$.

4. The valve assembly according to claim 2 wherein the at least one bushing includes a mount structure that is fixed to the exhaust component body such that the flap pivots about the axis defined by the bushing.

5. The valve assembly according to claim 1 wherein the at least one damper comprises at least a first damper located between the bushing and the flap and a second damper that is attached to the flap to reduce noise as the flap moves to the minimum flow position and wherein the second damper is comprised of a material that has a higher density than the low density wire mesh material of the first damper.

6. The valve assembly according to claim 5 wherein the flap includes a mounting boss at one edge that provides an internal recess that receives the at least one bushing, and wherein the flap extends to a distal edge that pivots between the minimum and maximum flow positions, and wherein the second damper has a first edge that is fixed to the flap at a location near the one edge and a second edge that is free from attachment to the distal edge such that as the flap returns to the minimum flow position the second edge of the damper first contacts the exhaust component body and then the distal edge contacts the second edge of the second damper.

7. The valve assembly according to claim 6 wherein the exhaust component body comprises a tube having an open end, and wherein, when in the minimum flow position, the flap closes the open end.

8. A valve assembly for a vehicle exhaust system comprising:
   an exhaust component body defining an exhaust gas flow path;
   a flap mounted to pivot in the exhaust gas flow path between a minimum flow position and a maximum flow position;
   at least one bushing to support the flap for rotational movement relative to the exhaust component body about an axis;
   at least one damper positioned radially between the bushing and the flap, and wherein the at least one damper defines an inner diameter that is smaller than an outer diameter of the at least one bushing;
   wherein the at least one damper comprises at least a first damper located between the bushing and the flap and a second damper that is attached to the flap to reduce noise as the flap moves to the minimum flow position;
   wherein the flap includes a mounting boss at one edge that provides an internal recess that receives the at least one bushing, and wherein the flap extends to a distal edge that pivots between the minimum and maximum flow positions, and wherein the second damper has a first edge that is fixed to the flap at a location near the one edge and a second edge that is free from attachment to the distal edge such that as the flap returns to the minimum flow position the second edge of the damper first contacts the exhaust component body and then the distal edge contacts the second edge of the second damper; and wherein the second damper comprises a wire mesh body that is mounted to an upstream face of the flap, and including a blade spring that is coupled to the second edge such that the blade spring provides damping and the wire mesh body provides sealing.

9. The valve assembly according to claim 8 wherein the wire mesh body comprises a ring-shaped body made from a high density wire mesh material, and wherein the blade spring extends across the ring-shaped body.

10. A valve assembly for a vehicle exhaust system comprising:
an exhaust component body defining an exhaust gas flow path;
a flap mounted to pivot in the exhaust gas flow path between a minimum flow position and a maximum flow position;
at least one bushing to support the flap for rotational movement relative to the exhaust component body about an axis; and
at least one damper positioned radially between the bushing and the flap, and wherein the at least one damper defines an inner diameter that is smaller than an outer diameter of the at least one bushing;
wherein the at least one damper comprises at least a first damper located between the bushing and the flap and a second damper that is attached to the flap to reduce noise as the flap moves to the minimum flow position;
wherein the flap includes a mounting boss at one edge that provides an internal recess that receives the at least one bushing, and wherein the flap extends to a distal edge that pivots between the minimum and maximum flow positions, and wherein the second damper has a first edge that is fixed to the flap at a location near the one edge and a second edge that is free from attachment to the distal edge such that as the flap returns to the minimum flow position the second edge of the damper first contacts the exhaust component body and then the distal edge contacts the second edge of the second damper; and
wherein an upstream face of the flap includes at least one protrusion, and wherein the second damper comprises a flat wire mesh body that is mounted to the upstream face of the flap such that the at least one protrusion deforms a portion of the wire mesh body to define a protruding portion, and wherein the protruding portion provides damping and the wire mesh body provides sealing.

11. The valve assembly according to claim 10 wherein the flat wire mesh body comprises a ring-shaped body made from a high density wire mesh material with a bridge portion that extends across the ring-shaped body, and wherein the at least one protrusion deforms the bridge portion.

12. A valve assembly for a vehicle exhaust system comprising:
an exhaust component body defining an exhaust gas flow path;
a flap mounted to pivot in the exhaust gas flow path between a minimum flow position and a maximum flow position;
at least one bushing to support the flap for rotational movement relative to the exhaust component body about an axis; and
at least one damper positioned radially between the bushing and the flap, and wherein the at least one damper defines an inner diameter that is smaller than an outer diameter of the at least one bushing;
wherein the at least one damper comprises at least a first damper located between the bushing and the flap and a second damper that is attached to the flap to reduce noise as the flap moves to the minimum flow position;
wherein the flap includes a mounting boss at one edge that provides an internal recess that receives the at least one bushing, and wherein the flap extends to a distal edge that pivots between the minimum and maximum flow positions, and wherein the second damper has a first edge that is fixed to the flap at a location near the one edge and a second edge that is free from attachment to the distal edge such that as the flap returns to the minimum flow position the second edge of the damper first contacts the exhaust component body and then the distal edge contacts the second edge of the second damper; and
wherein an upstream face of the flap includes at least one protrusion, and wherein the second damper comprises a wire mesh body that is mounted to an upstream face of the flap such that the at least one protrusion at least partially fills an open area of the wire mesh body.

13. The valve assembly according to claim 12 wherein the wire mesh body comprises a ring-shaped body made from a high density wire mesh material with a bridge portion that extends across the ring-shaped body to form first and second open areas, and wherein the at least one protrusion comprises first and second protrusions that respectively fill the first and second open areas.

14. A valve assembly for a vehicle exhaust system comprising:
an exhaust component body defining an exhaust gas flow path;
a flap mounted to pivot in the exhaust gas flow path between a minimum flow position and a maximum flow position, wherein the flap has a first flap edge that defines a pivot axis and a second flap edge that pivots between the minimum and maximum flow positions; and
at least one damper attached to an upstream face of the flap to reduce noise as the flap moves to the minimum flow position, wherein the at least one damper comprises a ring-shaped body that has a first edge that is fixed to the flap at a location near the first flap edge and a second edge that is free from attachment to the second flap edge such that as the flap returns to the minimum flow position the second edge of the damper first contacts the exhaust component body and then the second flap edge contacts the second edge of the damper.

15. The valve assembly according to claim 14 including at least one bushing to support the flap for rotational movement relative to the exhaust component body about the pivot axis, and wherein the flap includes a mounting boss that provides an internal recess that receives the at least one bushing, and wherein the at least one damper comprises a first damper comprised of a high density wire mesh material attached to the flap and a second damper positioned within the internal recess to surround the at least one bushing, and wherein the second damper defines an inner diameter that is smaller than an outer diameter of the at least one bushing, and wherein the second damper is comprised of a low density wire mesh material.

16. The valve assembly according to claim 14 wherein the ring-shaped body is comprised of a high density mesh material.

17. The valve assembly according to claim 16 including a blade spring that is coupled to the second edge and extends across the ring-shaped body such that the blade spring provides damping and the ring-shaped body provides sealing.

18. The valve assembly according to claim 16 wherein the upstream face of the flap includes at least one protrusion, and wherein the ring-shaped body includes a bridge portion that extends across the ring-shaped body such that the at least one protrusion deforms the bridge portion of the ring-shaped body to define a protruding portion, and wherein the protruding portion provides damping and the ring-shaped body provides sealing.

19. The valve assembly according to claim 16 wherein an upstream face of the flap includes at least first and second protrusions, and wherein the ring-shaped body includes a bridge portion that extends across the ring-shaped body to form first and second open areas, and wherein the first and second protrusions respectively fill the first and second open areas.

20. The valve assembly according to claim 14 wherein the flap is resiliently biased to the minimum flow position and only moves from the minimum flow position toward the maximum flow positions in response to an increase in exhaust gas pressure against the upstream face of the flap to overcome a biasing force.

21. The valve assembly according to claim 5 wherein the material of the second damper comprises a high density wire mesh material that has a density that is greater than 4.0 g/cm$^3$.

22. The valve assembly according to claim 14 wherein the first flap edge and the second flap edge of the ring shaped-body are at opposing peripheral edges of the flap, and wherein the first edge of the ring-shaped body is fixed to the flap at the first flap edge and the second edge of the ring shaped-body extends to the second flap edge but is free from attachment to the second flap edge.

23. The valve assembly according to claim 14 wherein the first damper is comprised of a high density wire mesh material and wherein the second damper is comprised of a low density wire mesh material.

24. The valve assembly according to claim 23 wherein the low density wire mesh material has a density that is less than 3.5 g/cm$^3$, and wherein the high density wire mesh material has a density that is greater than 4.0 g/cm$^3$.

25. The valve assembly according to claim 14 wherein the ring-shaped body has an outer peripheral surface and an inner peripheral surface that defines at least one inner open area.

\* \* \* \* \*